United States Patent [19]

Morita et al.

[11] Patent Number: 4,513,990
[45] Date of Patent: Apr. 30, 1985

[54] BUSHING STRUCTURE IN A VEHICLE SUSPENSION SYSTEM

[75] Inventors: Yasuhiro Morita, Okazaki; Yoshikazu Tsukamoto, Inuyama, both of Japan

[73] Assignees: Toyota Kidosha Kabushi Kaisha, Toyota; Tokai Rubber Industries, Ltd., Komaki, both of Japan

[21] Appl. No.: 460,540

[22] Filed: Jan. 24, 1983

[30] Foreign Application Priority Data

Jan. 30, 1982 [JP] Japan ............................. 57-12389[U]

[51] Int. Cl.³ ............................................. B60G 11/14
[52] U.S. Cl. ............................. 280/725; 267/57.1 A; 267/63 R; 267/153; 308/4 R
[58] Field of Search ................ 280/725, 726; 267/153, 267/63 R, 63 A, 57.1 A; 308/4 R

[56] References Cited

U.S. PATENT DOCUMENTS

| 2,403,362 | 7/1946 | Hait et al. ....................... 267/57.1 A |
| 3,443,794 | 5/1969 | Peterson ............................... 308/4 R |
| 3,764,158 | 10/1973 | Lukasik et al. ..................... 280/725 |
| 4,044,977 | 8/1977 | Feucht ................................ 267/153 |

FOREIGN PATENT DOCUMENTS 584924 9/1933 Fed. Rep. of Germany ..... 267/57.1 A
2220857 11/1973 Fed. Rep. of Germany ..... 267/57.1 A Primary Examiner—Joseph F. Peters, Jr.
Assistant Examiner—Kenneth R. Rice
Attorney, Agent, or Firm—Browdy and Neimark

[57] ABSTRACT

A bushing structure in a vehicle suspension system including a support secured to a vehicle chassis or an axle housing, a fulcrum shaft supported by the support and rotatably supporting the bushing structure, and a suspension arm pivotally connected to the bushing structure. The bushing structure comprises an outer metal fitting connected to the suspension member, an inner cylindrical metal member in which the fulcrum shaft is inserted, and an annular resilient member secured to the outer periphery of the inner cylindrical metal member and press-fitted in the outer metal fitting together with the inner cylindrical member. The bushing structure further comprises a plurality of radial stop rings positioned within the annular resilient member in spaced relation with one another axially of the annular resilient member. The bushing structure may preferably further comprise one or two annular axial stop members each including a stop ring embedded therein. The axial stop member is positioned on the respective end portion of the resilient member. The annular resilient member in a preferred form of the bushing structure has a plurality of annular grooves formed outwardly of the radial stop rings.

8 Claims, 5 Drawing Figures

BUSHING STRUCTURE IN A VEHICLE SUSPENSION SYSTEM

BACKGROUND OF THE INVENTION

The present invention relates generally to an elastic bushing structure for use in a vehicle suspension system, and more particularly to such bushing structure which has provisions for restraining an increase in elastic yielding or deformation of a resilient member when radial or rotational loads to be applied to the structure exceed a given limit, thereby enhancing driving maneuverability and stability of the vehicle.

In a vehicle suspension system known in the art, various types of suspension members in the form of, for example, arms, rods and links are connected to parts of the vehicle chassis, axle housing and like members of the vehicle so that the suspension members are pivotable in various directions. To damp or absorb vibrations transmitted to those suspension members and for other purposes, a resilient suspension bushing has been commonly used for pivotal connections at both ends of each suspension member.

For example, there is shown in FIG. 1 a known 4-link wheel suspension system wherein a rigid axle housing 1 accommodating an axle is pivotally supported by a vehicle chassis through a pair of upper control arms 2 and a pair of lower control arms 3 which are disposed perpendicularly to the axle so that the axle housing 1 is vertically oscillatable. A bushing assembly 5 is incorporated in each of pivotal connections 4 between the ends of the control arms 2, 3, and the axle housing 1 and the chassis. Similarly, the bushing assembly 5 is used in pivotal connections at both ends of a lateral control rod 6 with the axle housing 1 and the chassis.

As shown in FIG. 2, the above indicated suspension bushing 5 comprises an inner cylindrical metal member 7 in which is inserted a suitable fulcrum shaft supported by a fixed member for suspension purpose, and further comprises an annular resilient member 8 secured to the outer periphery of the inner cylindrical metal member 7. This bushing assembly 5 of the inner member 7 and the resilient member 8 is adapted to be press-fitted in an outer cylindrical metal fitting or suspension arm eye 9 concentric with the inner and resilient members 7 and 8.

A damper or shock absorber including such suspension bushing assembly or structure 5 exhibits linear elastic or spring characteristics as represented by broken line A of FIG. 4, wherein the elastic deformation or strain of the resilient member in a direction normal to the axis thereof (in the radial direction R) is in substantially direct proportion to a load or stress applied to the structure 5 in the radial direction. This means that as the resiliency of the resilient member is reduced (the more soft material is used for the resilient member) the resilient member can absorb vibrations, noises, etc. with increased ease, but it is elastically deformed an increased amount with a result of degrading driving stability and maneuverability. The same relation exists between the magnitude of a rotational torque load applied to the structure in a direction T so as to cause the axis of the structure to be inclined, and the amount of elastic deformation produced by such torque load. Thus, the known suspension bushing structure has a drawback that it is incapable of assuring satisfactory driving maneuverability and stability while fulfilling its original function of vibration damping, and shock and noise absorption.

SUMMARY OF THE INVENTION

It is accordingly an object of the present invention to provide a suspension bushing structure for a vehicle, which is capable of assuring satisfactory driving maneuverability and stability of the vehicle without reducing its original function of vibration damping, and shock and noise absorption.

Another object of the invention is to provide such type of suspension bushing structure which exhibits soft spring characteristics while a load to be applied to the structure is held within a low range, and hard or rigid spring characteristics after the load exceeds a given upper limit.

According to the invention, there is provided a bushing structure in a vehicle suspension system including a support secured to vehicle members such as a chassis and an axle housing, a fulcrum shaft supported by the support and rotatably supporting the bushing structure, and a suspension member pivotally connected to the bushing structure, the bushing structure comprising:

an outer metal fitting connected to said suspension member;

an inner cylindrical metal member in which the fulcrum shaft is inserted;

an annular resilient member secured to the outer periphery of the inner cylindrical metal member and press-fitted in the outer metal fitting together with the inner cylindrical metal member; and a plurality of radial stop rings positioned within the annular resilient member in spaced relation with one another axially of the annular resilient member.

In accordance with one preferred feature of the invention, the bushing structure further comprises at least one annular elastic axial stop member including a stop ring embedded therein, the axial stop member being fitted on one of axial end portions of the outer periphery of the annular resilient member and engaging a corresponding end face of the outer metal fitting.

According to another preferred feature of the invention, the annular resilient member of the bushing structure has a plurality of annular grooves corresponding to the axial stop rings, the annular grooves being each formed to a predetermined depth radially outwardly of respective one of the axial stop rings, and cooperating with the inner periphery of the outer metal fitting to define a radial gap of a predetermined width along the axis of the resilient member.

BRIEF DESCRIPTION OF THE DRAWINGS

The above and other objects, features and advantages of the present invention will become more apparent from reading the following description of the preferred embodiment taken in connection with the accompanying drawings in which.

DETAILED DESCRIPTION OF THE PREFERRED EMBODIMENT

The present invention will be described in detail with reference to the accompanying drawings which illustrate the preferred form of a suspension bushing of this invention.

Figure 3:
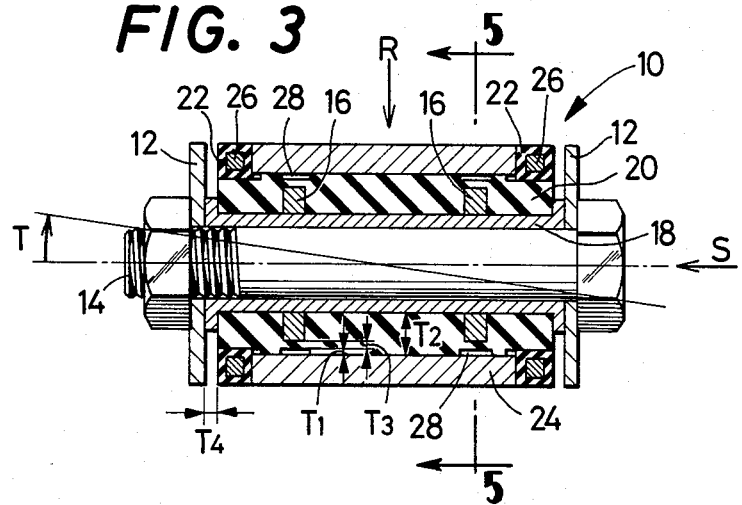
FIG. 3 is a similar cross section showing one embodiment of a suspension bushing structure constructed according to the present invention.

Referring first to FIG. 3, there is shown a suspension bushing structure generally indicated at 10. The suspension bushing structure 10 is rotatably supported by a fulcrum shaft 14 which in turn is supported by and between a pair of brackets 12, 12 secured to a part of a vehicle chassis or axle housing of the vehicle. The bushing structure 10 comprises: an inner cylindrical metal member 18 provided with two radial stop rings 16; an annular resilient member 20 made of rubber internally vulcanized to the outer periphery of the inner cylindrical metal member 18; and a pair of annular elastic axial stop members 22 press-fitted on the opposite axial end portions of the annular resilient member 20, respectively.

More specifically stated, the radial stop rings 16 are each made of resin or metal material, and press-fitted on the inner cylindrical metal member 18 at axially symmetric positions spaced an equal distance from the center towards the ends of the inner metal member 18. The annular resilient member 20 is secured, by means of vulcanization, to the outer surface of the inner cylindrical metal member 18 such that the radial stop rings 16 are embedded in the annular resilient member 20. This resilient member is dimensioned so that it is press-fitted in and held by an outer cylindrical metal fitting 24 (hereinafter simply referred to as "outer fitting 24") connected to a suspension member of the suspension system. The axial stop members 22 made of rubber each having therein an embedded stop ring 26 of resin material are press-fitted, with a considerable amount of interference, on the outer periphery of the opposite axial end portions of the resilient member 20, so that the stop members 22 engages corresponding end faces of the outer fitting 24 and face side surfaces of the brackets 12.

The annular resilient member 20 is provided, at portions of its outer periphery radially outward of the radial stop rings 16, with a corresponding pair of annular grooves 28 of a predetermined depth $T_1$. Each of the annular grooves 28 cooperates with the inner periphery of the outer fitting 24 to define an annular radial gap $T_1$ of a width along the axis of the resilient member as shown in FIG. 3.

Figure 5:
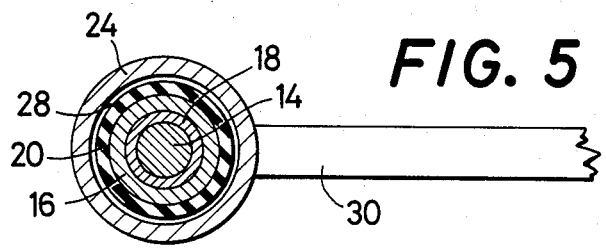
FIG. 5 is a view taken along line 5—5 of FIG. 3.

Referring to FIG. 5, there is shown a bushing structure wherein the outer fitting 24 is an eye at either end of a suspension arm (suspension link or rod) 30. This arm eye 24 is an integral part of the suspension arm 30 and receives the press-fitted annular resilient member 20 and inner metal member 18. However, the outer fitting 24 is not limited to such arm eye integral with the suspension arm 30, and it is possible that a separate cylindrical metal member having the press-fitted annular resilient member 20 be attached to the end of the suspension arm, rod or link by suitable fixing means.

In the suspension bushing structure 10 wherein the annular grooves 28 are provided in the outer periphery of the resilient member as described above, application of a radial load to the structure 10 in a direction normal to the axis thereof (in the radial direction indicated by arrow R) will first cause a substantive portion of the resilient member to radially yield except at portions adjacent the bottom of the annular grooves 28 whereby the radial load initially applied before the annular radial gaps $T_1$ are lost due to initial deformation of the annular resilient member 20 is received by the resilient member 20 over a comparatively large wall thickness $T_2$. However, the continuous application of the radial load subsequent to the loss of the annular gaps $T_1$ will cause the radial stop rings 16 to start receiving the load through wall portions having a very small thickness $T_3$ which is defined by the bottom of the annular grooves 28 and the outer periphery of the stop rings 16. Thus, the diameter of the radial stop rings 16 and the depth of the annular grooves 28 are selected so that the wall thickness $T_2$ is considerably greater than the depth (gap) $T_1$ and the wall thickness $T_3$. In other words, the wall thickness of a substantive portion of the annular resilient member 20 as measured at a position between the annular grooves 28 is considerably greater than that of the grooved portions of the resilient member 20.

Figure 1:
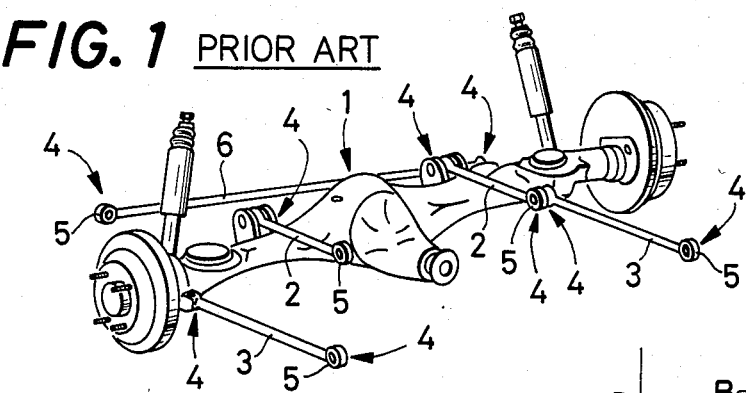
FIG. 1 is a perspective view exemplifying a known 4-link wheel suspension system used on vehicles.
Figure 2:
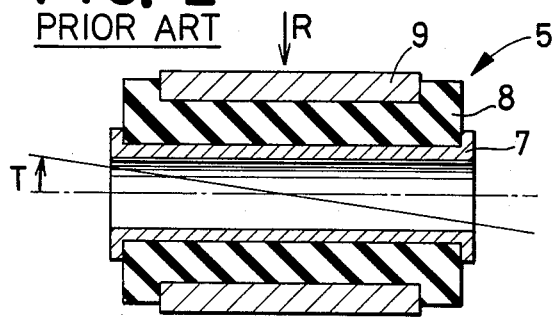
FIG. 2 is a longitudinal cross section of the suspension bushing structure used in the suspension system of FIG. 1.
Figure 4:
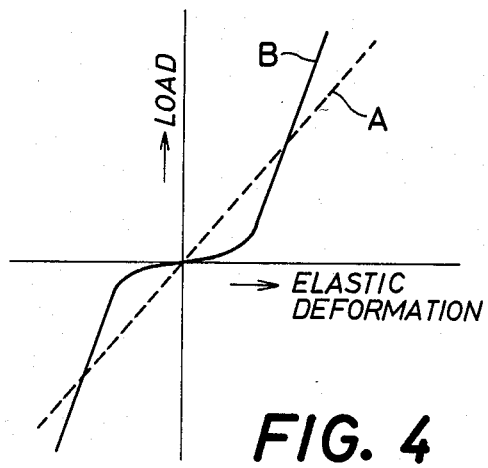
FIG. 4 is a graphical representation of spring characteristics of load-deformation (stress-strain) curves of the known and instant bushing structures for comparison, wherein a broken line A shows the spring characteristics of the known bushing while a solid line B shows that of the instant bushing.

Upon radial load application in the radial direction R, therefore, the suspension bushing structure 10 in this preferred form of the invention will exhibit soft spring characteristics when the magnitude of a load to be applied is in a low range, but exhibit hard or rigid spring characteristics when the magnitude is in a high range, i.e., exceeds a certain level. Thus, the load-deformation (stress-strain) curve inherent to the structure 10 is non-linear as represented by solid line B in FIG. 4.

To obtain similar effects in the axial direction, it is designed that the end faces of the axial stop members 22 are axially spaced from the brackets 12 such that there exists an annular axial gap $T_4$ at each end of the structure. Like the radial gaps $T_1$, these annular axial gaps $T_4$ function to give the bushing structure 10 soft spring characteristics during an initial application of load in the axial direction indicated by arrow S or before the gaps $T_4$ have been lost due to initial deformation of the axial stop members 22, but after the gaps $T_4$ have been lost, give the structure 10 hard spring characteristics because of direct abutment or bearing of the axial stop members 22 on or against the respective brackets 12.

Further, similar effects are obtained even when the suspension bushing structure 10 discussed above is subjected to a rotational torque load in a direction indicated by arrow T in FIG. 3. In this instance where the rotational torque load acts on the structure 10 so as to incline the axis thereof, one of the radial stop rings 16 is forced to move radially in one direction (downwardly in FIG. 3) while the other radial stop ring 16 in the opposite direction (upwardly in FIG. 3). As a result, the two rings 16 are displaced toward the diametrically opposite segments of the inner periphery of the outer fitting 24. Thus, the same principle of operation as discussed above is applicable to elastic deformation or yielding of the structure 10 due to application of the rotational torque load thereto. In other words, the structure 10 exhibits soft spring characteristics before the annular gaps $T_1$ and $T_4$ have been lost, but hard spring characteristics after the gaps have been lost due to further deformation of the resilient member 20 and elastic stop members 22.

As described in detail solely by way of illustration, the suspension bushing structure 10 has the spring characteristics represented by a non-linear load-deformation curve upon application of loads in any of the radial, axial and rotational directions R, S and T. This non-linear elastic curve feature means a dual functionality or a two-step damper and/or absorber capability, i.e., the bushing structure 10 is usable on one hand as soft damper and/or absorber which permit excellent damping or absorption of vibrations, shocks and noises of the vehicle during an ordinary cruising run of the vehicle wherein the loads applied to the structure 10 and the resultant deformation or strain of the annular resilient member 20 are both kept at a low level, and also usable on the other hand as rigid damper and/or absorber which restrain further deformation of the resilient member 20 and the elastic stop members 22 beyond a critical point when high loads are applied to the structure 10, for example, during a cornering run of the vehicle, thereby enhancing driving maneuverability and stability of the vehicle. Stated in a different way, the suspension bushing structure according to the invention serves two functions; damping/absorption of vibrations and noises, and assurance of satisfactory driving maneuverability and stability which have been considered incompatible in the art. In addition, the restraint of the deformation or displacement of the resilient or elastic member upon application of exceedingly high loads will result in a considerable increase in the durability or service life of the suspension bushing structure.

While the bushing structure 10 in the foregoing embodiment has been disclosed, for simplification of the description, such that only two radial stop rings 16 are secured to the inner metal member 18, it is appreciated to provide more than two radial stop rings 16 as needed.

Although it is preferable that the elastic axial stop member 22 be provided at both ends of the resilient member 20, it is sufficient to provide the axial stop member 22 at one end of the member 20. Further, it is noted that the provision of the stop member 22 at both ends of the resilient member 20 is impossible in some instances.

It is also noted that the annular grooves 28 formed in the outer periphery of the annular resilient member 20 will enhance the non-linear spring characteristics of the bushing structure 10 upon application of loads in the radial direction R. It is understood, however, that the absence of such annular grooves will not nullify the non-linear elastic properties of the structure 10, namely the non-linear feature does exist, without the annular grooves, to such significant extent that is enough to attain the objects of the present invention.

While the suspension bushing structure of the invention has been described in its preferred form with a certain degree of particularity, it is to be understood that the invention is not limited thereto but may be otherwise embodied with various modifications and changes within the scope of the appended claims.

What is claimed is:

1. A bushing structure in a vehicle suspension system including support means secured to vehicle members such as a chassis and an axle housing, a fulcrum shaft supported by the support means and rotatably supporting the bushing structure, and a suspension member pivotally connected to the bushing structure, said bushing structure comprising:
   an outer metal fitting connected to said suspension member;
   an inner cylindrical metal member in which said fulcrum shaft is inserted;
   an annular resilient member secured to the outer periphery of said inner cylindrical metal member and press-fitted in said outer metal fitting together with said inner cylindrical metal member;
   a plurality of radial stop rings positioned within said annular resilient member in spaced relation with one another axially of said annular resilient member; and
   at least one annular elastic axial stop member including a stop ring embedded therein, said axial stop member being fitted on one of the axial end portions of the outer periphery of said annular resilient member and engaging a corresponding end face of said outer metal fitting.

2. A bushing structure as recited in claim 1, wherein said annular resilient member has a plurality of annular grooves corresponding to said axial stop rings, said annular grooves being each formed to a predetermined depth radially outwardly of respective one of said axial stop rings, and cooperating with the inner periphery of said outer metal fitting to define a radial gap of a predetermined width along the axis of the resilient member.

3. A bushing structure as recited in claim 2, wherein the wall thickness of a substantive portion of said annular resilient member as measured at a position between said annular grooves is considerably greater than that of the grooved portions of the resilient member which is defined by the outer periphery of said radial stop rings and the bottom of said annular grooves.

4. A bushing structure as recited in claim 1, wherein said plurality of radial stop rings are press-fitted on the outer periphery of said inner cylindrical metal member and said annular resilient member is internally vulcanized to the outer periphery of said inner cylindrical member.

5. A bushing structure as recited in claim 1, wherein said outer metal fitting is an arm eye of the suspension member.

6. A bushing structure as recited in claim 1, wherein said annular elastic axial stop member is provided at both end portions of said annular resilient member.

7. A bushing structure as recited in claim 1, wherein said annular elastic axial stop member faces a part of said support means with a predetermined axial gap therebetween.

8. A bushing structure in a vehicle suspension system including a pair of planar support members secured to vehicle members such as a chassis and an axle housing and spaced axially of the bushing structure, a fulcrum shaft supported by the support members and rotatably supporting the bushing structure, and a suspension member pivotally connected to the bushing structure, said bushing structure comprising:
   an outer metal fitting connected to one end of said suspension member;
   an inner cylindrical metal member in which said fulcrum shaft is inserted;
   an annular resilient member internally vulcanized to the outer periphery of said inner cylindrical metal member and press-fitted in said outer metal fitting over a substantive length thereof;
   a plurality of radial stop rings made of rigid material and press-fitted on the outer periphery of said inner cylindrical member such that the radial stop rings are embedded within said annular resilient member, said radial stop rings are positioned in spaced relation with one another axially of said annular resilient member; and
   two annular elastic axial stop members each including a rigid stop ring embedded therein, said stop members being press-fitted on opposite axial end portions of said annular resilient member, engaging corresponding opposite end faces of said outer metal fitting and facing planar support members, said annular resilient member having a plurality of annular grooves corresponding to said axial stop rings, said annular grooves being each formed to a predetermined depth radially outwardly of respective one of said axial stop rings, and cooperating with the inner periphery of said outer metal fitting to define a radial gap of a predetermined width along the axis of the resilient member, said planar support members and said two annular elastic axial stop members defining an axial gap at said opposite axial end portions of said annular resilient members.

* * * * *

UNITED STATES PATENT AND TRADEMARK OFFICE
CERTIFICATE OF CORRECTION

PATENT NO. : 4,513,990
DATED : April 30, 1985
INVENTOR(S) : Yasuhiro Morita et al.

It is certified that error appears in the above-identified patent and that said Letters Patent is hereby corrected as shown below:

On the title page, the assignee should read

-- Toyota Jidosha Kabushiki Kaisha, Toyota;

Tokai Rubber Industries, Ltd., Komaki, both of

Japan --.

Signed and Sealed this

Fifteenth Day of April 1986

[SEAL]

Attest:

DONALD J. QUIGG

Attesting Officer

Commissioner of Patents and Trademarks